Aug. 4, 1964  J. A. RICHARDSON  3,142,919
ANIMATED DISPLAY
Filed Sept. 13, 1962  2 Sheets-Sheet 1
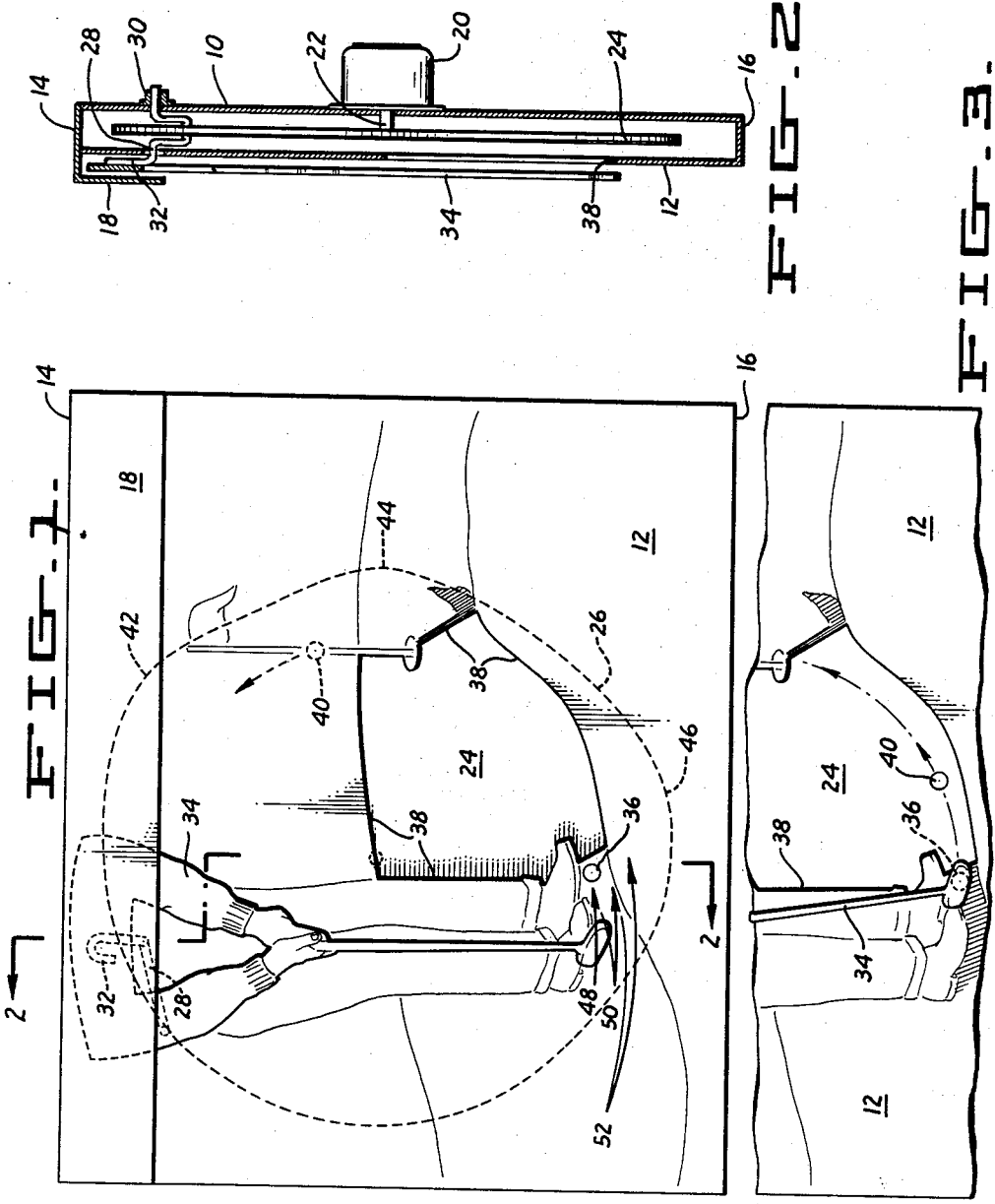
INVENTOR.
JAMES A. RICHARDSON
BY
Naylor + Neal
ATTORNEYS Aug. 4, 1964   J. A. RICHARDSON   3,142,919
ANIMATED DISPLAY
Filed Sept. 13, 1962   2 Sheets-Sheet 2
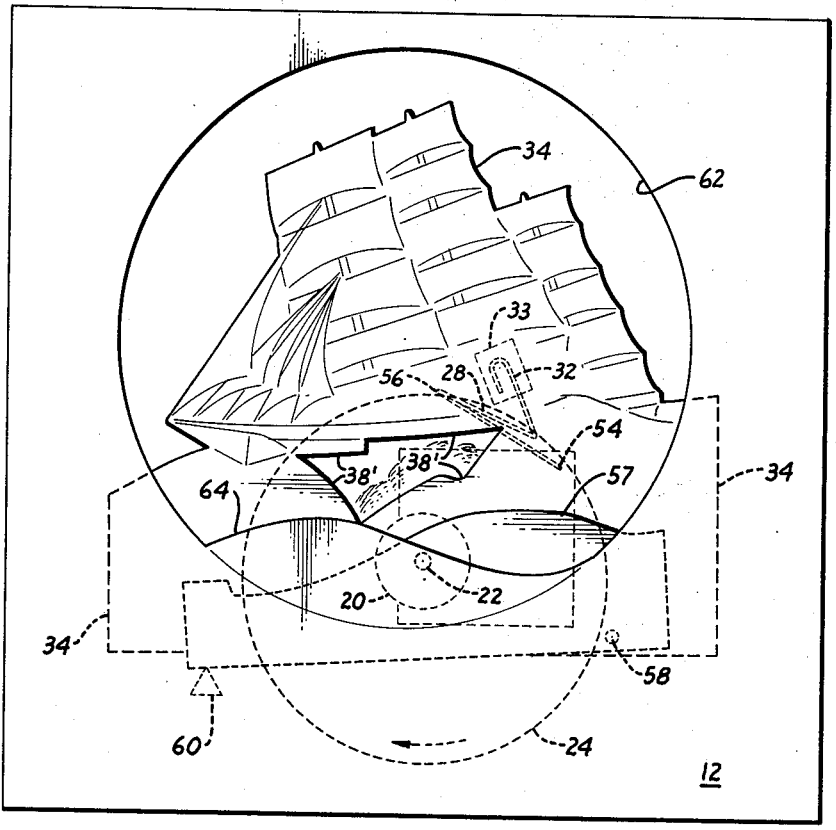
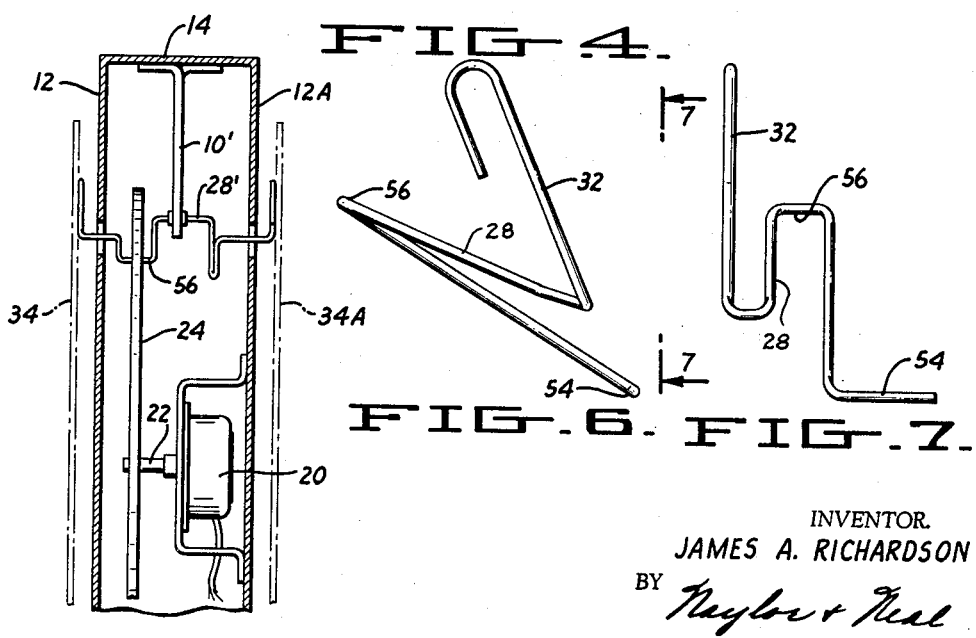
INVENTOR.
JAMES A. RICHARDSON
BY
ATTORNEYS United States Patent Office 3,142,919
Patented Aug. 4, 1964

3,142,919
ANIMATED DISPLAY
James A. Richardson, 2447 Vallejo St.,
San Francisco, Calif.
Filed Sept. 13, 1962, Ser. No. 223,372
6 Claims. (Cl. 40—106.41)

This invention relates to animated displays and more particularly to apparatus for generating predetermined motions in the type of animated displays which are used for advertising signs.

In the presentation of advertising concepts through animated displays, devices are required for generating an almost infinite variety of relative motions between different display members. In many animated displays, for instance, mechanisms are required for generating motions which are natural and life-like. The motions which must be produced by these mechanisms are often very complex, but the mechanisms themselves must be extremely simple in order that the animated displays can be manufactured at low unit cost to be sold at competitive prices and in order that they can be operated unattended for long periods of time.

It is an object of this invention to provide a single device for generating motion in animated displays with which almost any motion required in a particular display can be generated simply by proper selection of sizes, shapes and positions for a small number of basic components.

It is another object of the invention to provide such a motion device with which a plurality of elements can be moved with respect to each other while absolutely assuring that the different moving elements will move in synchronization with each other and return to synchronization if disturbed.

It is another object of the invention to provide such a motion generator in which display members may be moved about pivotal axes while maintaining complete design freedom in the choice of where the pivotal axes and movable members will be located with respect to each other and with respect to other components of the display.

It is another object of the invention to provide such a motion generating device and animated displays containing the same which are as simple and inexpensive in construction as possible and which can be driven by very small electric or battery driven motors.

It is another object of the invention to provide such animated displays which can give the appearance of one component of the display moving across the display while a second component moves across the first component.

It is another object of the invention to provide such an animated display which may be constructed with a minimum number of light weight parts and which can be constructed without the use of complex drive linkages, counterbalances and the like.

It is another object of the invention to provide such a motion generating device for animated displays which is adapted for use both in large outdoor billboards and in small indoor displays on store counters and the like.

Other objects and advantages of the invention will become apparent from the following description read in conjunction with the attached drawings in which:

FIG. 1 is a view in front elevation of an animated display constructed in accordance with the principles of the invention;

FIG. 2 is a vertical sectional view of the display of FIG. 1 taken along the plane indicated at 2—2 in FIG. 1;

FIG. 3 is a face view of a portion of the display of FIG. 1 showing the display in a different condition;

FIG. 4 is a view in front elevation of another animated display constructed in accordance with the principles of the invention;

FIG. 5 is a vertical sectional view through another alternative form of animated display of this invention illustrating the application of the principles of the invention to a double sided animated display;

FIG. 6 is a view in elevation of a wire support member employed in the display of FIG. 4, and FIG. 7 is a view in end elevation of the support member of FIG. 6 taken along the plane indicated at 7—7 in FIG. 6.

The animated display illustrated in FIGS. 1–3 depicts a golfer putting a golf ball on a green and comprises a display frame having a rear support panel 10 and a front display panel 12 connected together by top and bottom walls 14 and 16 respectively. A hood panel 18 is mounted on the top panel 14.

A small electric motor 20 is mounted on the outside of the back support panel 10 and has a rotary shaft 22 extending through the back panel 10 and supporting between the panels 10 and 12 a rotary disc 24 having an irregular periphery which defines an endless cam surface indicated by dotted lines 26 in FIG. 1. A wire support member 28 is pivotally mounted on the back panel 10 by means of a bracket 30 and has a loop portion extending around the disc 24 and engaging the cam surface 26 thereon and terminating in a finger 32 between the front panel 12 and hood 18 of the display. A suitable aperture is provided in the front panel 12 as indicated in FIG. 2 for permitting passage of the wire support member 28 therethrough. A movable display member 34 denoting the arms and golf club of a golfer is supported on the free end 32 of the wire by means of a conventional shoe (not shown in FIG. 1, but shown at 33 in FIG. 4) so that the movable member 34 will pivot about the axis of the bracket 30 responsive to movement of the cam surface 26 underneath the portion of the wire 28 which contacts the periphery of the disc 24.

In the display illustrated in FIGS. 1 and 2, suitable art work is provided on the display panel 12 denoting the legs and feet of the golfer and a golf ball 36. A window 38 is provided in the display panel 12 adjacent to the golfer's left leg, and art work is provided on the face of the disc 24 visible through the window 38. The art work on the disc 24 shown in FIGS. 1–3 is simply a smooth green background denoting the grass of the green with a second golf ball 40 painted thereon. As indicated in FIG. 1, peripheral cam surface 26 on the disc 24 is provided with a pair of small protrusions 42 and 44 thereon and a large protrusion 46 which effect respectively two small tentative strokes (indicated by arrows 48 and 50) of the golf club, as the protrusions 42 and 44 pass under the cam follower of the wire 28 and a final large stroke 52 as the large protrusion 46 passes under the wire. The periphery of the cam surface 26 does not reach its point of minimum radius immediately following the protrusions 42 and 44 so that the head of the golf club does not quite reach the golf ball 36 following the two tentative strokes 48 and 50. However, the cam surface 26 does reach its point of minimum radius following the large protrusion 46, and when this area of minimum radius passes under the cam follower 28, the head of the golf club on the movable display member 34 moves across the golf ball 36 obscuring it while simultaneously the golf ball 40 on the face of the disc 24 moves out from under the panel 12 into the window 38 and proceeds across the window 38 to disappear from the window 38 underneath the cup in the golf green denoting a successful putt.

In the animated display illustrated in FIG. 4, the movable member 34 has the shape of a ship supported on waves and is mounted on the ear 32 of a wire support member 28 which is pivotally mounted on the back panel of the display at a pivotal axis 54. The support wire, the shape of which is best seen in FIGS. 6 and 7, has a cam follower portion 56 which engages the peripheral surface of a rotary disc 24 which in this display is circular but eccentrically mounted on the shaft 22 of electric motor 20. Accordingly, rotation of the disc 24 causes the movable display member 34 to pitch back and forth as the cam surface on the periphery of disc 24 moves under the cam follower 56.

In this display, a window 38' is provided in the movable member 34. The window 38' is bounded by the lines on the art work which denote the edges of the hull of the ship on the movable member 34. An auxiliary art panel 57, denoting a wave, is pivotally mounted at one end about a pivotal axis 58 on the movable member 34 and is supported at its other end on a fulcrum 60 attached to the front panel 12 of the display; thus, rocking motion of the movable member 34 is accompanied by a rocking and lateral sliding motion of the auxiliary movable member 57. This display also carries art work on the face of the rotary disc 24 which is visible through the window 38', and this art work is in the form of a black background which appears to be the hull of the ship. A pattern of white spray is provided on the black background on the disc 24 so that water spray appears to cascade upwardly across the hull of the ship as the ship rocks back and forth into and out of the waves in the display. The front panel 12 of the display is formed with a circular opening 62 which may be surrounded by art work to denote the interior of a porthole while additional art work extends across the bottom of the porthole to illustrate a stationary wave 64 into which the hull of the ship plunges in synchronization with movement of spray upwardly across the window 38'.

In the display illustrated in FIG. 5, the frame of the display is provided with two display panels 12 and 12A, two movable display members 34 and 34A and a single rotary disc 24 carrying art work on both of its faces for viewing through windows (not shown) in both display panels 12 and 12A or both movable members 34 and 34A. The movable display members 34 and 34A are supported on a single wire support arm 28' having a single cam follower portion 56 engaging the endless periphery of the disc 24. In this display, the support wall 10' of the frame is provided on the interior of the frame between the two panels 12 and 12A, and the electric motor 20 by which the disc 24 is supported and driven is mounted on the interior of the display panel 12A though it may also be mounted on the support panel 10 is desired.

In the particular animated displays illustrated herein, the movable members 34 have been shown as members which are pivoted or swung about pivotal axes, however it is obvious that other support arrangements for the movable members in the displays may be made where it is desirable to provide some other type of motion. Thus, the movable member 34 in the display may be pivotally mounted on the ear 32 of the support wire 28 so that the weight of the movable member 34 supports it in a given vertical condition while the upper end of the movable member is translated by the ear 32 of the wire 28. The movable member 34 may also be slidably mounted on the display panel 12 of the frame so that the wire 28 effects simple linear translation of the member 34. Where the member 34 is pivotally connected to the wire 28 as indicated above, the member 34 may also be pivotally connected at an adjacent or remote point to the panel 12 so that it will move as a first, second or third class lever as the disc 24 moves under the cam follower portion of the wire 28. Obviously a variety of additional support expedients may be employed in this manner to generate any desired display motion which may be appropriate in any particular animated display. It has been found that most efficient operation of the displays can be obtained, and locking of the cam and cam follower eliminated where the disc rotates into the cam follower instead of away from the cam follower, that is when the periphery of the disc moves (as in FIG. 4) toward the cam follower 56 from the side (left) of the cam follower opposite to side (right) where the support member is pivoted at 54.

It should be noted that the movable display members 34 are so positioned on the animated displays of the drawings with respect to the pivotal axes of the wire 28 and cam followers thereon so that the weight of each movable member 34 maintains its cam follower in engagement with the peripheral cam surface 26 of the disc. Where some other arrangement is desired, suitable means such as counterbalances or weak springs may be employed to maintain the cam follower in engagement with the cam; however, the use of such auxiliary means is not desirable in most situations because it is desirable to maintain the cam follower in engagement with the cam with as light a pressure as possible thereby permitting the use of very small electric motors 20 to drive the displays and also permitting the operation of the displays for very long periods of time without causing any damage to the working parts of the display. With the motion generating device of this invention, it is generally possible to avoid the use of such counterweights and the like by proper selection of the locations of the pivot axes and cam followers on the support member and by proper location of the point on the movable member where the movable member is mounted on the support member.

Additionally, a wide variety of auxiliary devices may be employed with the animated displays illustrated where such auxiliary devices may be desirable as for the purpose of providing larger and stronger displays for outdor use and the like. The principles of the invention may also be employed while utilizing devices having a plurality of rotating discs, transparent or opaque, which appear through or obscure one or more windows in the art work or through transparent portions of the art work and the like and/or while utilizing one or more movable members controlled by one or more support members which engage the periphery of one or more discs.

While certain specific details of animated displays constructed in accordance with the principles of the invention have been illustrated and described in detail herein, it is obvious that many modifications thereof may be made without departing from the spirit and scope of the invention.

I claim:

1. An animated display comprising a frame, a disc mounted on said frame for rotation about an axis and having a cam surface on the periphery thereof, a movable display member, and support means mounting said display member on said frame and engaging said cam surface at a predetermined angular position around the axis of rotation thereof for moving said display member responsive to rotation of said disc with said support means pivotally connected to said frame and engaging said disc only along the peripheral cam surface thereon.

2. The display of claim 1 in which said support means comprises a wire having first and second support portions and a cam engaging portion spaced apart longitudinally of said wire with said first support portion attached to said movable member and said second support portion pivotally mounted on said frame and with said cam engaging portion positioned between said support portions and being generally U-shaped with a closed end and two legs with the legs extending from the closed end inwardly of the disc from its periphery and with the closed end in engagement with the periphery of said disc.

3. The display of claim 2 in which said second support portion is pivotally mounted on said frame at a pivotal axis which lies between the periphery of said disc and said axis of rotation of the disc.

4. An animated display comprising a frame having a display panel, a disc mounted on said frame for rotation about an axis and having a display face thereon and an endless cam surface on the periphery thereof, a support wire pivotally mounted on said frame on the side of said disc opposite to said display panel and engaging said cam surface for pivotal movement of said wire responsive to rotation of said disc, a movable display member mounted on said wire adjacent to said display panel with said member and said panel defining a composite display in which said member moves with respect to said panel responsive to rotation of said disc and in which said wire is unconnected to said frame between said disc and said movable display member and engages said disc only along said cam surface on said disc, and a window in said composite display exposing a portion of said display face of said disc whereby portions of said display face move across said composite display in synchronization with movement of said member.

5. An animated display comprising a frame having a support panel and a display panel mounted in fixed position with respect to each other, a disc mounted on said frame between said panels for rotation about an axis and having a display face facing toward said display panel and an endless cam surface on the periphery thereof, a support wire pivotally mounted on said support panel between the periphery of said disc and said axis with said wire having a free end on the side of said disc opposite from said support panel and an intermediate cam follower portion with legs adjacent opposite faces of said disc and a base between said legs and engaging said cam surface, a movable display member mounted on said free end of said wire adjacent to said display panel with said display member and said display panel defining a composite display in which said member moves with respect to said panel responsive to rotation of said disc, and a window in said composite display exposing a portion of said display face of said disc whereby portions of said display face move across said window as said display member moves responsive to rotation of said disc.

6. An animated display comprising a support frame, a disc mounted on said frame for rotation about an axis and having a display face thereon and an endless cam surface surrounding said axis, a movable display member having a window therein, and support means mounting said movable member on said frame with said window exposing a portion of said disc and with said support means engaging said cam surface for moving said movable member responsive to rotation of said disc while said window moves across portions of said display face in synchronization with movement of said movable member with respect to said frame as said display member moves with respect to said frame responsive to rotation of said disc.

References Cited in the file of this patent
UNITED STATES PATENTS

| | | |
|---|---|---|
| 663,614 | Riedmuller | Dec. 11, 1900 |
| 1,049,699 | Glaves | Jan. 7, 1913 |
| 1,254,573 | Burkart | Jan. 22, 1918 |
| 1,311,601 | Garami | July 29, 1919 |
| 1,764,834 | Gatliff | June 17, 1930 |
| 1,792,521 | Wilson | Feb. 17, 1931 |
| 2,053,351 | Stenger | Sept. 8, 1936 |
| 2,146,192 | Kraemer | Feb. 7, 1939 |